United States Patent [19]

Haggard

[11] Patent Number: 5,269,571
[45] Date of Patent: Dec. 14, 1993

[54] FUEL FILTER RETAINING CLIP HAVING ROTATING FLIPPER PORTIONS

[75] Inventor: Clifford D. Haggard, Tulsa County, Okla.

[73] Assignee: Purolator Products, Inc., Tulsa, Okla.

[21] Appl. No.: 949,036

[22] Filed: Sep. 22, 1992

[51] Int. Cl.$^5$ ............................................. F16L 37/084
[52] U.S. Cl. ................................. 285/305; 285/320; 285/319
[58] Field of Search ............... 403/326; 285/305, 320, 285/321, 308, 319; 24/635

[56] References Cited

U.S. PATENT DOCUMENTS

| | | | |
|---|---|---|---|
| 2,805,089 | 9/1957 | Hansen | 285/317 |
| 3,002,870 | 10/1961 | Belgarde et al. | 156/70 |
| 3,298,409 | 1/1967 | Elson | 403/326 |
| 3,352,576 | 11/1967 | Thorne-Thomsen | 285/169 |
| 3,428,340 | 2/1969 | Pelton | 285/95 |
| 3,453,005 | 7/1969 | Foults | 285/82 |
| 3,527,485 | 9/1970 | Goward et al. | 285/305 |
| 3,534,988 | 10/1970 | Lindsey | 285/305 |
| 3,538,940 | 11/1970 | Graham | 137/271 |
| 3,574,359 | 4/1971 | Klein | 285/86 |
| 3,584,902 | 6/1971 | Vyse | 285/305 |
| 3,628,768 | 12/1971 | Hutt | 251/148 |
| 3,871,088 | 3/1975 | Leitner | 24/81 |
| 3,922,011 | 11/1975 | Walters | 403/326 |
| 3,929,357 | 12/1975 | DeVincent et al. | 285/319 |
| 4,005,883 | 2/1977 | Guest | 285/322 |
| 4,244,608 | 1/1981 | Stuemky | 285/305 |
| 4,372,847 | 2/1983 | Lewis | 210/86 |
| 4,475,516 | 10/1984 | Atkins et al. | 285/305 |
| 4,524,995 | 6/1985 | Bartholomew | 285/54 |
| 4,526,411 | 7/1985 | Bartholomew | 285/305 |
| 4,601,497 | 7/1986 | Bartholomew | 285/319 |
| 4,772,052 | 9/1988 | Morain | 285/305 |
| 4,781,400 | 11/1988 | Cunningham | 285/39 |
| 4,834,423 | 5/1989 | DeLand | 285/39 |
| 4,851,118 | 7/1989 | Kurihara | 210/315 |
| 4,861,474 | 8/1989 | Kroha | 210/232 |
| 4,869,534 | 9/1989 | Ketcham et al. | 285/24 |
| 4,906,029 | 3/1990 | Kroha | 285/158 |
| 4,933,079 | 6/1990 | Kroha | 210/232 |
| 4,936,544 | 6/1990 | Bartholomew | 251/149 |
| 4,948,175 | 8/1990 | Bartholomew | 285/39 |
| 4,948,176 | 8/1990 | Bartholomew | 285/93 |
| 4,989,911 | 2/1991 | Van Order | 296/97.9 |
| 4,991,880 | 2/1991 | Bernart | 285/321 |
| 5,000,614 | 3/1991 | Walker et al. | 403/326 |
| 5,035,797 | 7/1991 | Janik | 210/232 |
| 5,056,756 | 10/1991 | Norkey et al. | 251/149.6 |
| 5,104,157 | 4/1992 | Bahner | 285/307 |

FOREIGN PATENT DOCUMENTS

| | | |
|---|---|---|
| 1266071 | 4/1968 | Fed. Rep. of Germany . |
| 2360921 | 6/1974 | Fed. Rep. of Germany . |
| 2266091 | 10/1975 | France ......................... 285/305 |
| 1030535 | 5/1966 | United Kingdom . |

Primary Examiner—Eric K. Nicholson
Attorney, Agent, or Firm—Head & Johnson

[57] ABSTRACT

The present invention is a clip for securing the nipple of a fuel filter within a fuel line connector assembly housing provided on a fuel line in order to secure the fuel filter to the fuel line. The clip is provided with a horizontally oriented connecting segment having two ends. Each end of the connecting segment is provided with a leg that extends downward therefrom. The legs are spaced apart from each other so as to be insertable through openings provided in the connector assembly housing. Each of the legs is provided with a flipper, with the flipper of one leg being offset from the flipper of the other leg with respect to a horizontal center line of the nipple when the nipple is installed in the connector assembly housing. The flippers are oriented toward the opposing legs so that as the nipple is inserted into the connector assembly housing, the nipple is forced between the flippers and the legs, causing the legs to rotate and squeeze the nipple. The legs are of triangular or other suitable cross-sectional shape in order to lock the nipple from backing out of the connector assembly housing once it is installed.

5 Claims, 2 Drawing Sheets

FUEL FILTER RETAINING CLIP HAVING ROTATING FLIPPER PORTIONS

BACKGROUND OF THE INVENTION

1. Field Of Invention

The present invention is a new type of locking retaining clip for fuel filters. More specifically, the present invention is a clip for securing a fuel filter to a connector assembly housing on a fuel line.

2. The Prior Art

There are large varieties of fuel filters and equally large varieties of connectors for attaching the fuel filters to a fuel line. One type of fuel filter is provided with a long nipple on one or both of its ends. An example of this type of filter can be found in U.S. Pat. No. 4,906,029, a copy of which is included with the accompanying Information Disclosure Statement. One type of connector assembly housing employed to secure this type of filter nipple to a fuel line is disclosed in U.S. Pat. No. 4,524,995, copy of which is also included with the aforementioned Information Disclosure Statement.

A clip is normally inserted in an opening provided in the connector assembly housing in order to secure the fuel filter nipple within the connector assembly housing. Prior art clips used for this purpose are provided with resilient opposing legs having inclined ramps that aid in spreading or forcing the legs of the clip apart. In use, the clip is first inserted into the connector assembly housing through the openings provided in the housing. A fuel filter nipple is then inserted into the connector assembly housing. As the nipple encounters the legs of the clip it engages the inclined ramps, forcing the legs to spread apart in a plane perpendicular to the longitudinal axis of the nipple allowing the nipple to move therebetween. Once the nipple is fully inserted into the connector assembly housing, the resilient legs tend to grip against the nipple thus locking the nipple in place and preventing it from backing out of the connector assembly housing.

The present invention is a new type of clip that eliminates the need for inclined ramps on the legs by employing offsetting flippers on each leg. The legs of the present invention do not spread apart to admit the nipple but rather undergo torsional rotation causing swaged upset in the nipple as it is installed. The present invention also locks the nipple in place differently than prior art clips. The clip of the present invention employs legs that have a cross-sectional shape that is triangular or of other suitable shape to prevent the legs from rotating in a direction to allow the nipple to be removed.

SUMMARY OF THE INVENTION

The present invention is a clip for use with a fuel line connector assembly housing as a means of securing a fuel filter nipple to the connector assembly housing. The clip is provided with a connecting segment having two horizontally oriented ends. Each end of the connecting segment is provided with a leg that extends downward therefrom. The legs are spaced apart from each other and a flipper is provided on each leg so that the flipper of one leg is offset from the flipper of the other leg with respect to a horizontal center line through the fuel filter nipple when the nipple is installed in the connector assembly housing. The flippers are oriented toward the opposing leg so that when the nipple is forced between the flippers and the legs, the legs experience torsional rotation and the nipple undergoes swaged upset. The legs are of triangular or other suitable cross-sectional shape in order to prevent torsional rotation of the legs in a direction that would allow the nipple to back out of the connector assembly housing once it is installed.

DETAILED DESCRIPTION OF THE PREFERRED EMBODIMENTS

Figure 1:
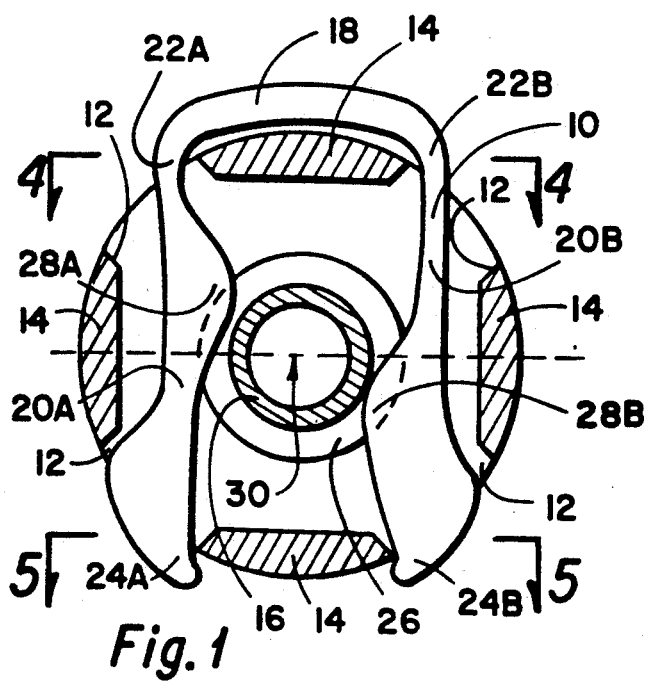
FIG. 1 is a cross-sectional view through a connector assembly housing containing a clip constructed according to a preferred embodiment of the present invention.

Referring now to the drawings and initially to FIG. 1, there is illustrated a fuel filter retaining clip, generally designated by reference numeral 10, constructed according to a preferred embodiment of the present invention. The clip 10 is designed to insert through openings 12 provided in a fuel filter connector assembly housing 14 in order to secure a fuel filter nipple 16 therein. The connector assembly housing 14 is connected to a fuel line (not shown) and the fuel filter nipple 16 is attached to a fuel filter (not shown). Fuel to be filtered flows from the fuel line (not shown) through the connector assembly housing 14 and through the fuel filter nipple 16 before reaching the fuel filter (not shown).

There is nothing new about the connector assembly housing 14 nor about the fuel filter nipple 16 as they appear respectively in U.S. Pat. No. 4,524,995 issued on Jun. 25, 1985 to John L. Kroha and U.S. Pat. No. 4,906,029 issued on Mar. 6, 1990 also to John L. Kroha. The two Kroha patents are incorporated by reference in this application.

Clip 10 is constructed of plastic or other suitably flexible material. The clip 10 is provided with a horizontal connecting segment 18 having two horizontally oriented ends, one end being provided with a left leg 20A and the other end being provided with a right leg 20B. Legs 20A and 20B extend perpendicularly downward from connecting segment 18 and are spaced apart from each other. The left and right legs 20A and 20B are provided respectively with upper portions 22A and 22B located proximally to connecting segment 18 and with opposite lower portions 24A and 24B located distally from connecting segment 18.

Figure 3:
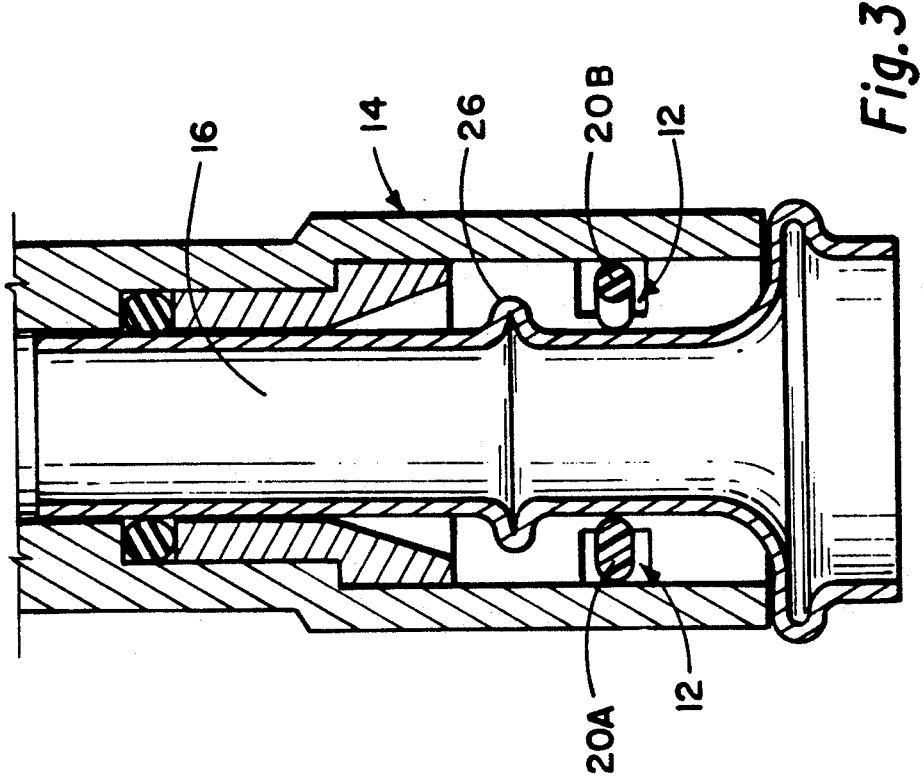
FIG. 3 is a partially cut-away top plan view showing the fuel filter nipple secured by the clip in an installed position in the connector assembly housing.
Figure 2:
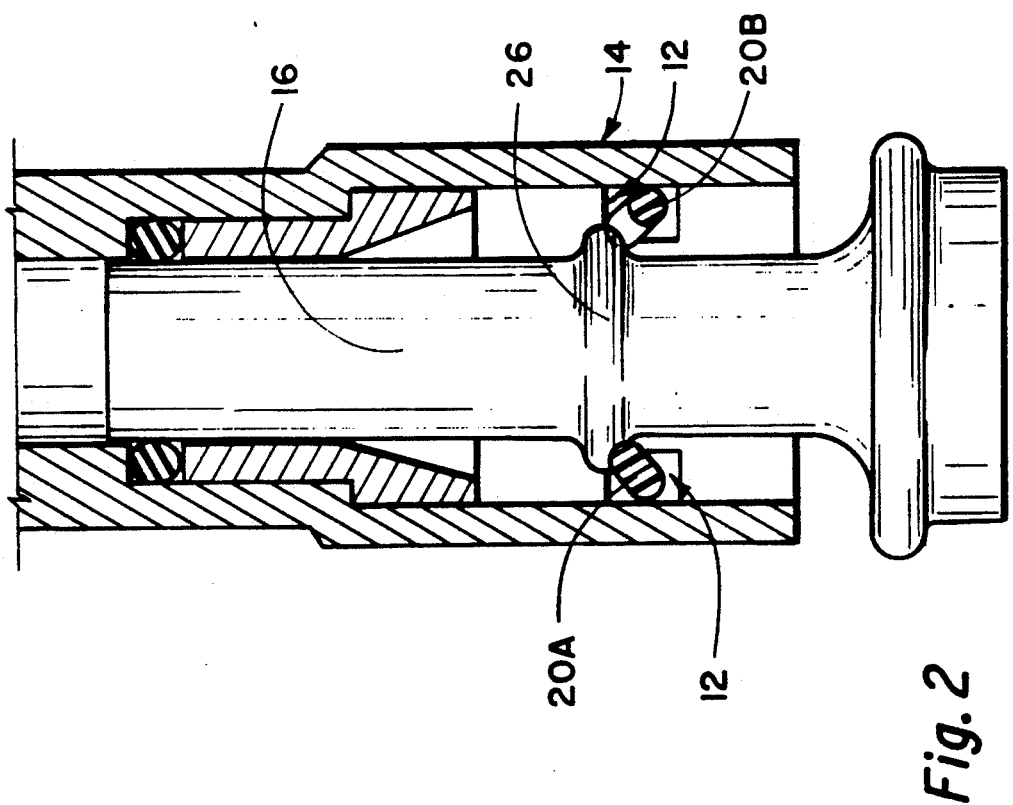
FIG. 2 is partially cut-away top plan view of the connector assembly housing showing a fuel filter nipple being installed by pushing it passed a pair of legs provided on the clip.

Referring now to FIGS. 2 and 3 and initially to FIG. 2, a cross-sectional view through legs 20A and 20B shows how legs 20A and 20B undergo torsional rotation. The fuel filter nipple 16 and a flange 26, located thereon, undergo swaged upset as they pass between legs 20A and 20B when the fuel filter nipple 16 is pushed into the connector assembly housing 14 to install it. FIG. 3 illustrates how legs 20A and 20B return to their original position after flange 26 has cleared the clip 10. When fuel filter nipple 16 has been installed by fully inserting it into connector assembly housing 14 and by swaging it between legs 20A and 20B of clip 10, the clip 10 holds the swaged fuel filter nipple 16 in place by means that will be hereinafter described.

Referring now again to FIG. 1, legs 20A and 20B are not symmetrical, i.e. they are not mirror images of each other. Instead, the upper portion 22A of the left leg 20A is provided with a left flipper 28A molded so that it extends inward toward the right leg 20B. The lower portion 24B of the right leg 20B is provided with a right flipper 28B molded so that it extends inward toward the left leg 20A. Although the left flipper 28A has been described as being located on the upper portion 22A and the right flipper 28B has been described as being located on the lower portion 24B, the relative upper and lower positions can be reversed, i.e. so that the left flipper 28A is located on the lower portion 24A of the left leg 20A and the right flipper 28B is located on the upper portion 22B of the right leg 20B. The critical feature is that flippers 28A and 28B, provided respectively on legs 20A and 20B, are offset from one another, with one being located on the upper portion (either 22A or 22B) so that it is above a horizontal center line 30 that runs through fuel filter nipple 16 when fuel filter nipple 16 is installed in the connector assembly housing 14 and the other being located on the lower portion (either 24A or 24B) so that it is below the horizontal center line 30 of fuel filter nipple 16.

Figure 4A:
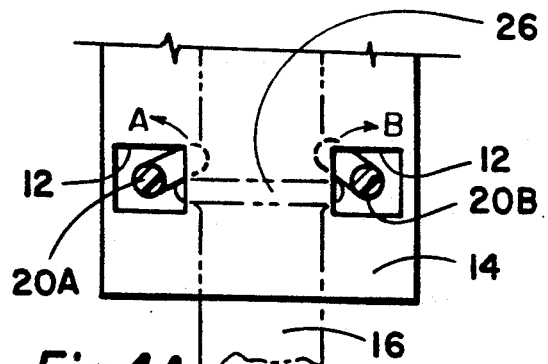
FIG. 4A is a diagrammatic cross-sectional view taken along line 4—4 of FIG. 1 showing relative positions of upper portions of the legs of the clip as they would appear during installation of the fuel filter nipple into the connector assembly housing.
Figure 4B:
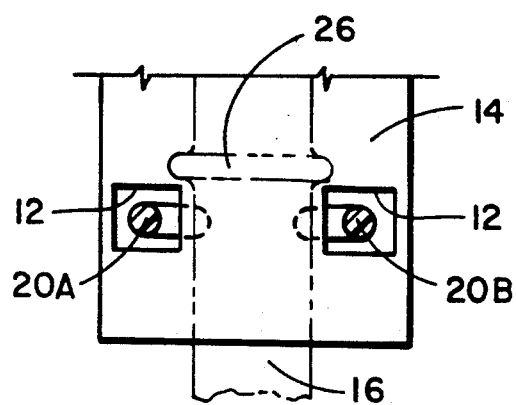
FIG. 4B is a diagrammatic cross-sectional view taken along line 4—4 of FIG. 1 showing relative positions of upper portions of the legs of the clip as they would appear when the fuel filter nipple is installed.

The purpose of flippers 28A and 28B is to provide interference with the swaged fuel filter nipple 16 so as to lock the fuel filter nipple 16 in place when the fuel filter nipple 16 is installed in the connector assembly housing 14. As illustrated in FIG. 4A looking downward at the clip 10, left leg 20A torsionally rotates counterclockwise, as shown by arrow "A", and right leg 20B torsionally rotates clockwise, as shown by arrow "B", as flange 26 is swaged therebetween. As shown in FIG. 4B, once fuel filter nipple 16 is installed, legs 20A and 20B return to their previous positions. The offset of flippers 28A and 28B allows clip 10 to be removed vertically from the openings 12 by exerting pulling and twisting forces on connecting segment 18.

Figure 5A:
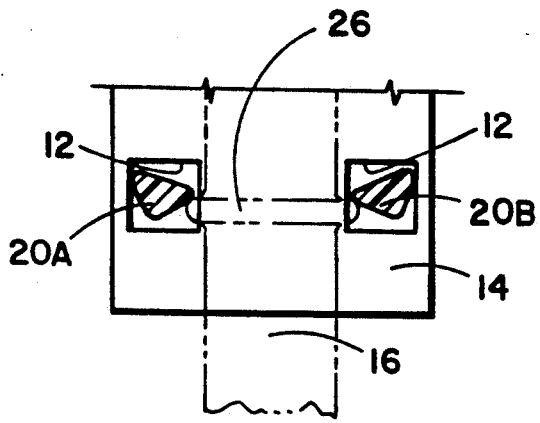
FIG. 5A is a diagrammatic cross-sectional view taken along line 5—5 of FIG. 1 showing relative positions of lower portions of the legs of the clip as they would appear during installation of the fuel filter nipple in the connector assembly housing.
Figure 5B:
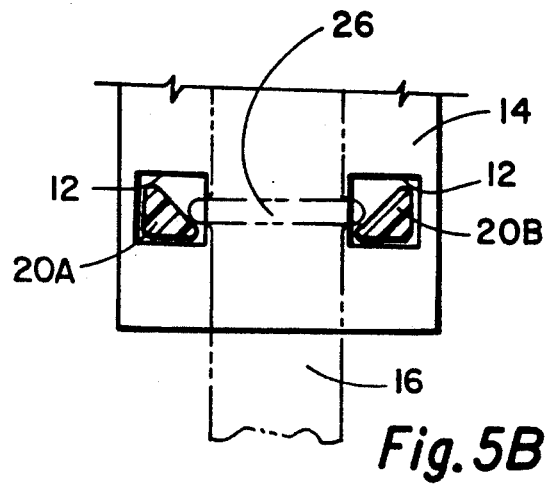
FIG. 5B is a diagrammatic cross-sectional view taken along line 5—5 of FIG. 1 showing relative positions of the lower portions of the legs of the clip as they would appear when the fuel filter nipple is installed.

To prevent the fuel filter nipple 16 from backing out of the connector assembly housing 14 once it has been installed, legs 20A and 20B are molded with a triangular cross-sectional shape that acts as a locking means. As shown in FIGS. 5A and 5B, the triangular shaped legs 20A and 20B torsionally rotate to allow fuel filter nipple 16 to be installed, but will not rotate in opposite directions to allow the fuel filter nipple 16 to be removed from the connector assembly housing 14. Although the legs 20A and 20B have been described as being triangular in cross-sectional shape, the present invention is not limited to a triangular shape and various shapes will suffice to create a locking means.

Whereas the present invention has been disclosed in terms of the specific structure described above, it should be understood that other and further modifications apart from those shown or suggested herein may be made within the spirit and scope of this invention, and the present invention is limited only by the claims included herein.

What is claimed is:

1. A retaining clip for securing a tubular nipple having an enlarged diameter flange portion to a connector assembly housing, comprising:
   a connecting segment having two ends;
   an integral leg being provided on each of said ends, the legs being spaced apart and extending from said ends providing an integral U-shaped member;
   a flipper portion being provided on each said leg so that the flipper portion of one of said legs is opposite from the flipper portion of the other said legs, said flipper portions being orientated towards each other so that the nipple enlarged diameter flange portion is swaged therebetween when installed by rotational displacement of said flipper portions.

2. A clip according to claim 1 wherein the legs are at least in part triangular in cross-sectional shape.

3. A clip according to claim 1 wherein the legs are rotationally flexible allowing them to undergo torsional rotation as the nipple enlarged diameter flange portion is inserted into the connector assembly housing.

4. A retaining clip for securing a tubular nipple member having an enlarged diameter flange portion to a connector assembly housing, comprising:
   a generally U-shaped clip having a bite portion connecting two spaced apart generally paralleled legs extending therefrom, each of the legs having a free end, each of the legs being defined by a non-circular portion, the non-circular portions having inner edges that in a first, non-actuated position of said legs are normally spaced apart a distance equal to about the diameter of said tubular nipple member and less than the diameter of said enlarged diameter flange portion, the legs each being rotatably deflectable in a first rotational direction to a second, actuated position when said nipple member flange portion is forced against the legs to permit said flange portion to pass between said legs, after which each of said legs resiliently rotates in a direction opposite said first rotational direction back to said first position, the legs being restrained against rotation in the opposite direction by cooperative relationship with said connector assembly housing to resist the extraction of said nipple member enlarged diameter flange portion out of said connector assembly housing.

5. A retaining clip according to claim 4 wherein each of said legs is, at least in part, substantially triangular in cross-section.

* * * * *